United States Patent [19]
Berglas

[11] 3,836,818
[45] Sept. 17, 1974

[54] STROBE LIGHT TRIGGER CIRCUIT

[76] Inventor: Robert E. Berglas, 30 East End Ave., New York, N.Y. 10028

[22] Filed: Feb. 22, 1973

[21] Appl. No.: 334,691

[52] U.S. Cl. .......... 315/240, 315/241 P, 331/113 A
[51] Int. Cl. ........................................... H05b 41/14
[58] Field of Search ............ 315/240, 241 R, 241 P; 331/113 A

[56] References Cited
UNITED STATES PATENTS

| | | | |
|---|---|---|---|
| 3,514,669 | 5/1970 | Helmuth | 315/240 X |
| 3,544,839 | 12/1970 | Fahnrich | 315/240 X |
| 3,551,845 | 12/1970 | Zelina | 331/113 A |
| 3,612,947 | 10/1971 | Dennewitz | 315/240 X |
| 3,644,818 | 2/1972 | Paget | 315/241 P |
| 3,716,753 | 2/1973 | Exner | 315/241 P |
| 3,758,817 | 9/1973 | Elliott | 315/240 X |

Primary Examiner—Alfred L. Brody
Attorney, Agent, or Firm—Cushman, Darby & Cushman

[57] ABSTRACT

A fast recycling trigger circuit for firing a strobe light on a camera with the camera's own X-synchronization switch with an oscillator powered by the camera battery, a tank circuit consisting of a capacitor charged by the oscillator and an inductor, and an SCR which is rendered conductive by manually operating the X-synchronization switch to discharge the capacitor through a strobe light trigger winding until the overswing caused by the resonance of the tank circuit back biases the SCR permitting the capacitor to thereafter rapidly recharge for another trigger.

12 Claims, 2 Drawing Figures

STROBE LIGHT TRIGGER CIRCUIT

BRIEF DESCRIPTION OF THE PRIOR ART AND SUMMARY OF THE INVENTION

The invention relates to an electrical current designed particularly for triggering a strobe light in a camera.

It is now quite common to equip cameras with a strobe light for both consumer and industrial photography. While many 35 mm cameras today can be triggered at speeds of six exposures a second or greater, existing circuits for triggering the strobe light have a much slower response. Most such circuits employ a capacitor which is slowly charged to a predetermined voltage and then rapidly discharged through the trigger winding of the strobe light. A typical required recycle time is 30 seconds. The slow build-up time of conventional strobe trigger circuits has rendered pyrrhic the development of fast exposure rates.

Another type of strobe unit which is now available does have a relatively fast recycle, but is toggled by motorized oscillator-slave techniques in which an oscillator is used to govern both the strobe and camera operation. Thus, the camera's shutter is under the control of an oscillator circuit rather than the preferable camera control of the flash.

The present invention relates to a unique circuit for triggering a strobe light for a camera in which the X-synchronization switch normally provided in most cameras is employed for triggering the strobe so that it is the camera which is in control of the strobe flash rather than vice versa. Further, the circuit can be rapidly recycled, permitting very fast successive operations of, for example, up to 50 flashes per second.

As described in detail below, in this circuit a unique and particularly efficient oscillator is continuously operated by the camera battery to produce a train of pulses which are applied to the primary winding of a transformer. The secondary transformer winding output is rectified by a full wave rectifier which is serially connected with a capacitance and inductance forming a resonant tank circuit. The rectified pulse train stores energy in the capacitance at a high voltage which is then dumped as a short-duration, high-amplitude pulse into a further transformer coil by triggering an SCR connected in a discharge path for the capacitance. The further transformer is coupled to a conventional trigger winding for a strobe light and the gate of the SCR is connected by logic elements to the camera's X-synchronization switch. Because of the circuit resonance, the capacitor overswings in discharging, providing a backbias voltage to the SCR via a diode to turn off the SCR and permit the capacitor to rapidly recharge for another cycle.

Since the strobe circuit is normally powered by the small camera battery, efficiency of operation is extremely important to maximize battery lifetime. Because the only current which flows in the circuit of this invention is the capacitor charge and discharge current, without any steady state D.C. current, the circuit efficiency is very high. In addition, the circuit continues to function properly as the battery voltage declines during battery failure. Further, the output voltage pulse developed across the coil secondary rises in a few micro-seconds to a high peak value independent of toggle speed. This extremely rapid rise time assures dependable operation of the strobe light.

Many circuits have, of course, been developed for firing strobe lights, spark plugs and other similar devices in which a capacitor is charged and then rapidly discharged to generate a high voltage pulse. The U.S. Pat. Nos. to Weiner, 3,381,172, Minks, 3,383,555, Tomkinson, 3,248,605, and Bowers, 3,251,351, illustrate circuits of this type. However, none resolve the above noted problems of firing a strobe light nor provide the particularly desirable results of the circuit of this invention.

Many other objects and purposes of the invention will become clear from the following detailed description of the drawings.

DETAILED DESCRIPTION OF THE DRAWINGS

Figure 1:
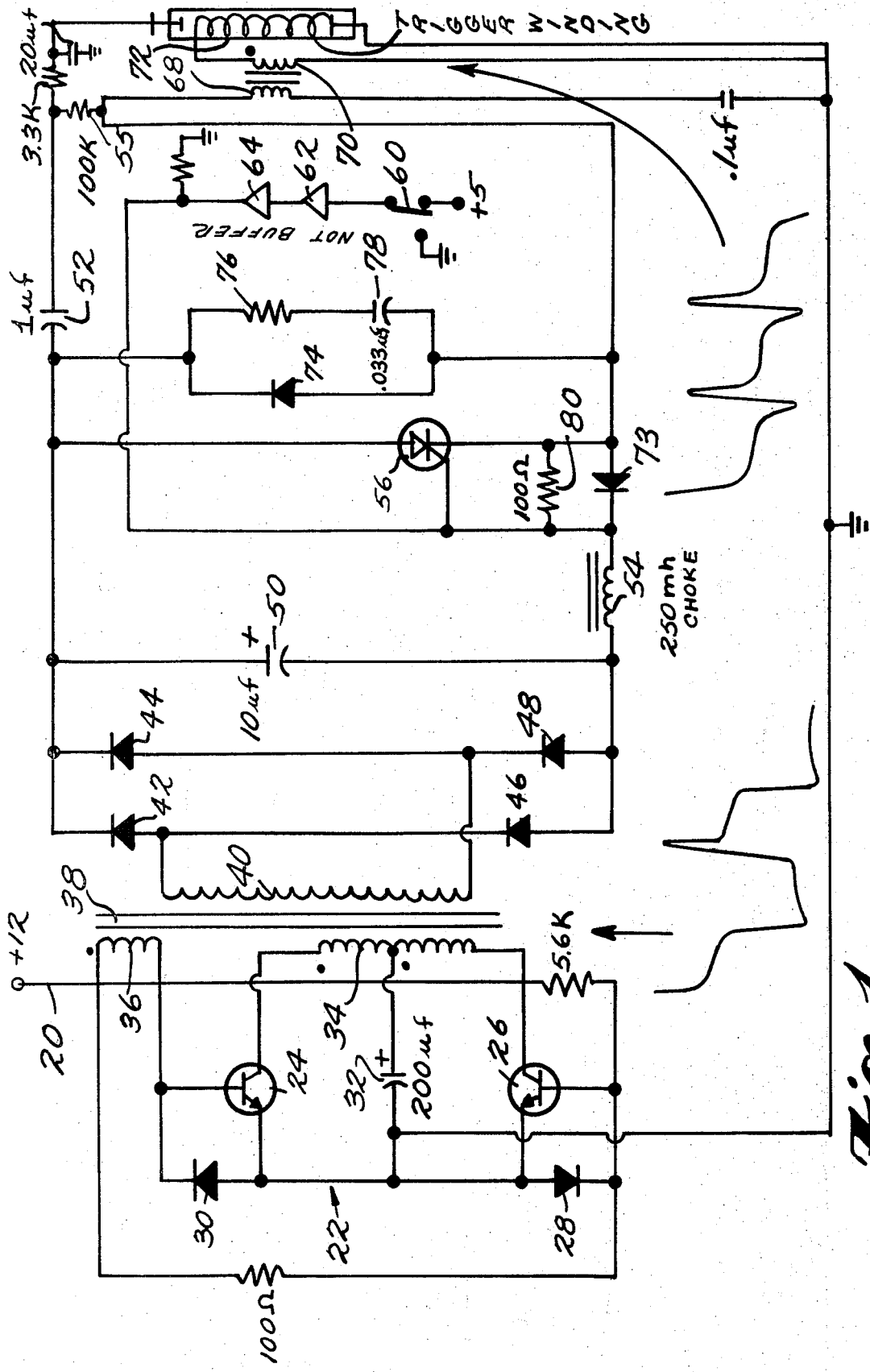
FIG. 1 illustrates a first embodiment of the novel circuit of this invention.

Reference is now made to FIG. 1 in which a conventional 12-volt portable battery, such as now used in conventional cameras, provides voltage on a line 20 to supply the energy requirements of the circuit. As mentioned above, the circuit is particularly designed to minimize energy usage in triggering the strobe light and is further designed to continue functioning as the voltage declines during the failure of the battery so that maximum usage is made of the small battery. The circuit functions well with a supply voltage as low as 6.50 volts.

Line 20 is connected to supply energy to a unique oscillator 22 which is comprised of transistors 24 and 26, diodes 28 and 30, and capacitor 32. Oscillator 22 is a very efficient saturating core square wave inverter which, with the element values shown in FIG. 1 operates continuously at about 8,000 Hertz as shown in FIG. 1. The output pulse train from oscillator 22 is connected to primary coils 34 and 36 of conventional transformer 38. The voltage appearing across secondary coil 40 of transformer 38 is rectified by the full wave rectifier comprising diodes 42, 44, 46 and 38. The output of the full wave rectifier is essentially a rectified square wave signal. This output is smoothed in part by a capacitor 50 and applied across the anode and cathode of a conventional SCR 56, which is, of course, rated to handle the currents and voltages it receives.

A capacitor 52, which forms with inductance 54 a resonant circuit, is connected to the full wave rectifier to charge via resistor 55 while SCR 56 remains non-conductive. Due to circuit resonance capacitor 52 charges to roughly twice the D.C. voltage across smoothing capacitor 50.

As mentioned above, SCR 56 is turned on to cause capacitor 52 to rapidly discharge by manual operation of the camera's own X-synchronization switch 60. Operating switch 60 grounds the input to NOT gate 62 providing a positive voltage which is amplified by buffer amplifier 64 to a level sufficient to fire SCR 56. Gates 62 and 64 suppress any contact bounce problems since noisy multiple contact has no effect on the logic stability.

When triggered, SCR 56 suddenly conducts and completes a discharge path for capacitor 52 through winding 68 and resistor 55. The high voltage pulse thus produced is applied to conventional strobe trigger winding 72 via winding 70 which is inductively coupled to winding 68, causing the strobe light to be fired.

Because of the circuit resonance provided by the tank circuit, capacitor 52 swings negative in its discharge, back biasing SCR via diode 73. The conventional surge suppression circuit comprising resistor 76, capacitor 78 and diode 74 keep the transient voltages across SCR within safe limits. Once SCR 56 has been turned off, capacitor 52 recharges as described above to begin a new cycle.

Figure 2:
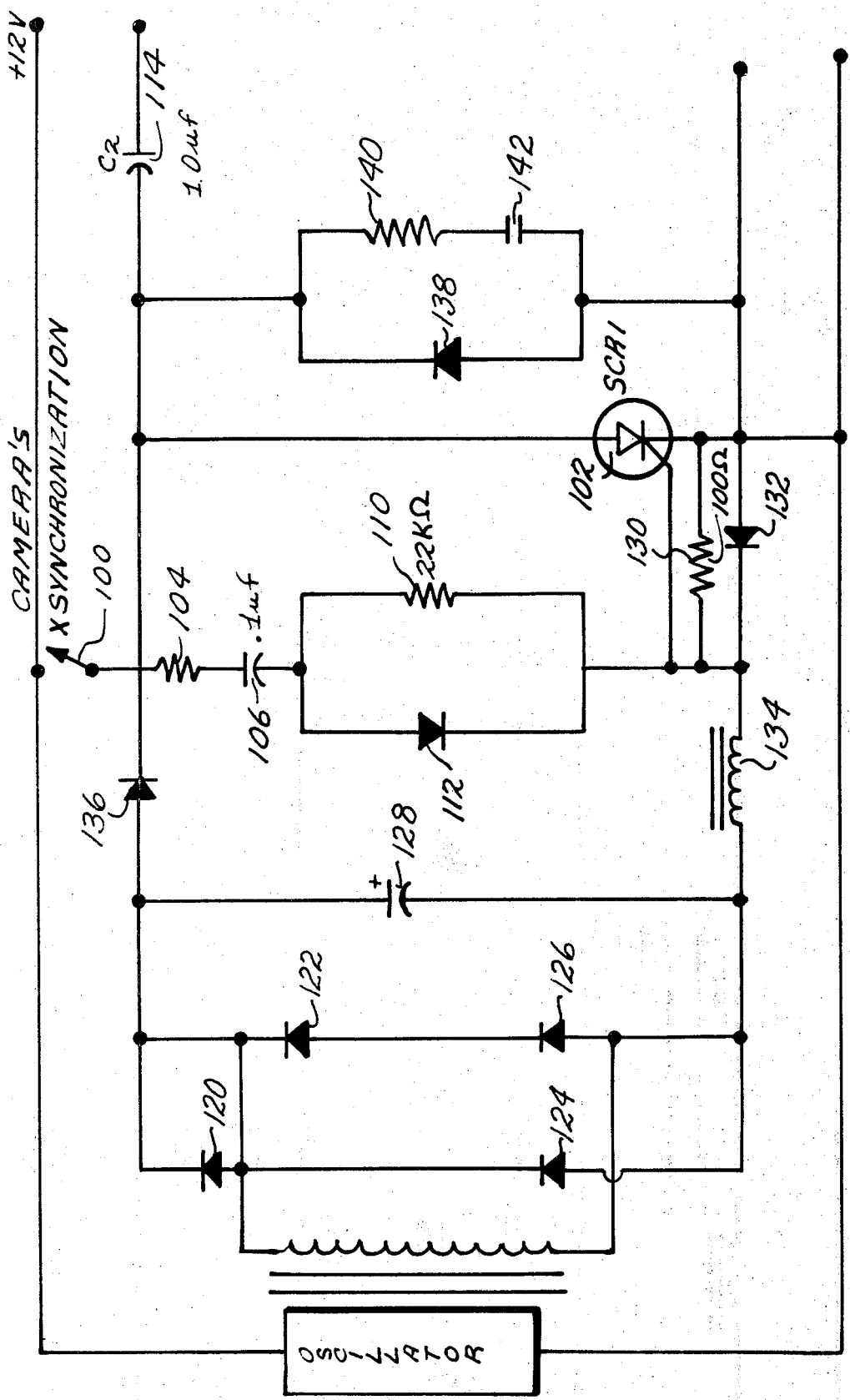
FIG. 2 illustrates a second embodiment of the novel circuit of this invention.

Reference is now made to FIG. 2 which illustrates a further similar embodiment of the invention in which the X-synchronization switch 100 is connected directly to the gate of SCR 102 via a passive circuit including resistor 104, capacitor 106, resistor 110 and diode 112. When X-synchronization switch 100 is manually closed, capacitor 106 begins to charge through resistor 104 producing a pulse which is limited by resistor 110 and applied to the gate of SCR 102 to render that SCR conductive and produce the discharge of capacitor 114 in the same fashion as described above. Even if switch 100 jams closed, capacitor 106 discharges slowly back to ground. The full wave rectifier comprising diodes 120, 122, 124 and 126, smoothing capacitor 128, resistor 130, diode 132, inductor 134, diode 136 and the surge suppressing circuit comprising diode 138, resistor 140 and capacitor 142 serve the same functions as the corresponding elements in FIG. 1.

The full wave rectifier comprising diodes 120, 122, 124 and 126, smoothing capacitor 128, resistor 130, diode 132, inductor 134, diode 136 and the surge suppressing circuit comprising diode 138, resistor 140 and capacitor 142 serve the same functions as the corresponding elements in FIG. 1.

In FIG. 1, the waveform produced by oscillator circuit 22 and the output applied to trigger winding 72 are shown. The output exhibits a very fast rising edge which reliably and rapidly triggers the strobe. The oscillator output is essentially a square wave with very fast rise time and some insignificant ringing of the leading edge.

Many changes and modification in the above-described embodiments of the invention can, of course, be carried out without departing from the scope thereof. Representative values for many of the elements are shown in FIG. 1 but no limitation to these particular values is intended. Accordingly, that scope is intended to be limited only by the scope of the appended claims.

What is claimed is:
1. A trigger circuit for a camera having a strobe light and an X-synchronization switch comprising:
   oscillator means for generating a train of electrical pulses,
   a tank circuit connected to said oscillator means including an inductor and a capacitance which is charged by said pulse train,
   electronic switching means serially connected to said capacitance and having a conductive and non-conductive condition, so that said capacitance is charged when said switching means is in said non-conductive condition and discharges when said switching means is in said conductive condition,
   means for triggering a strobe light connected to said capacitance, and
   means connected to the X-synchronization switch of said camera and to said electronic switching means for causing, when said X-synchronization switch is manually operated, said electronic switching means to shift from said non-conductive to said conductive condition to discharge said capacitance through said triggering means, triggering said strobe light, until said capacitance reaches a voltage level which causes said electronic switching means to shift back to said non-conductive state and said capacitor to then recharge.

2. A circuit as in claim 1 wherein said oscillator means includes an oscillator circuit, means for connecting said oscillator circuit to a D.C. battery, a transformer having a primary winding connected in series with said oscillator circuit and a secondary winding, and a full wave rectifier circuit serially connected to said secondary winding, wherein said electronic switching means is an SCR with its anode and cathode connected to said full wave rectifier and its gate connected to said causing means, and wherein said capacitance and inductance are serially connected to said full wave rectifier.

3. A circuit as in claim 2 wherein said oscillator circuit comprises a first transistor with its collector connected to one end of said primary winding, a second transistor with its collector connected to the other end of said primary winding, its emitter to the emitter of said first transistor, and its base to said D.C. source, a capacitor connected between said emitters of said first and second transistors and the midpoint of said primary winding, a first diode connected between said emitter and base of said first transistor and a second diode connected between said emitter and base of said second transistor, and a further winding coupled to said primary winding and connected between said bases of said first and second transistors.

4. A circuit as in claim 2 further including a smoothing capacitor connected to said full wave rectifier.

5. A circuit as in claim 2 further including a surge suppressing circuit connected in parallel with said SCR.

6. A circuit as in claim 5 wherein said surge suppressing circuit includes a serially connected resistor and capacitor and a diode connected in parallel with the combination of serially connected resistor and capacitor.

7. A circuit as in claim 2 wherein said causing means includes an NOT gate and a buffer amplifier connecting said X-synchronization switch to said gate of said SCR.

8. A circuit as in claim 2 wherein said triggering means includes a further transformer having a primary winding serially connected to said capacitance of said tank circuit and a secondary winding connected to a strobe trigger winding.

9. A circuit as in claim 2 further including a further resistor connected between said gate and cathode of said SCR and a diode connected in parallel with said further resistor, and wherein said inductor is connected between said gate of said SCR and said full wave rectifier.

10. A circuit as in claim 2 further including a D.C. battery connected to said oscillator circuit.

11. A circuit as in claim 2 wherein said causing means includes a serially connected resistor and trigger capacitor forming a first combination and a parallel connected diode and resistor forming a second combination serially connected to said first combination and connected to the gate of said SCR.

12. A trigger circuit for a camera having a battery, a strobe light and an X-synchronization switch comprising:

an oscillator circuit connected to said battery for generating a train of electrical pulses, a transformer having a primary winding connected to said oscillator circuit for receiving said pulses, and a secondary winding, a full wave rectifier connected to secondary winding, an SCR with its anode and cathode connected to said full wave rectifier so that the rectified pulse train passes through said SCR when said SCR is conductive, a tank circuit comprising a capacitor connected to said full wave rectifier and a inductor serially connected to said capacitor so that said capacitance charge while said SCR remains nonconductive, means connected between said X-synchronization switch and the gate of SCR for causing said SCR to shift from its conductive to said non-conductive condition when said X-synchronization switch is manually operated, and means connected to said capacitance for triggering said strobe light as said capacitor discharges when said SCR becomes conductive until said capacitance reaches a voltage level which back biases said SCR, causing said SCR to shift back to its non-conductive condition and said capacitor to recharge.

* * * * *